April 28, 1931.  W. O. HEBLER  1,802,713
GAS ANALYSIS APPARATUS
Filed July 1, 1930
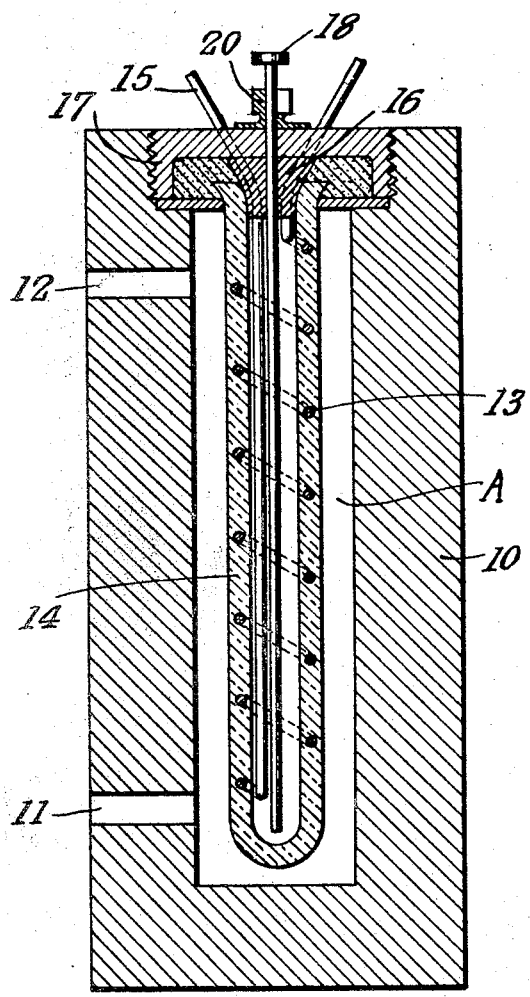
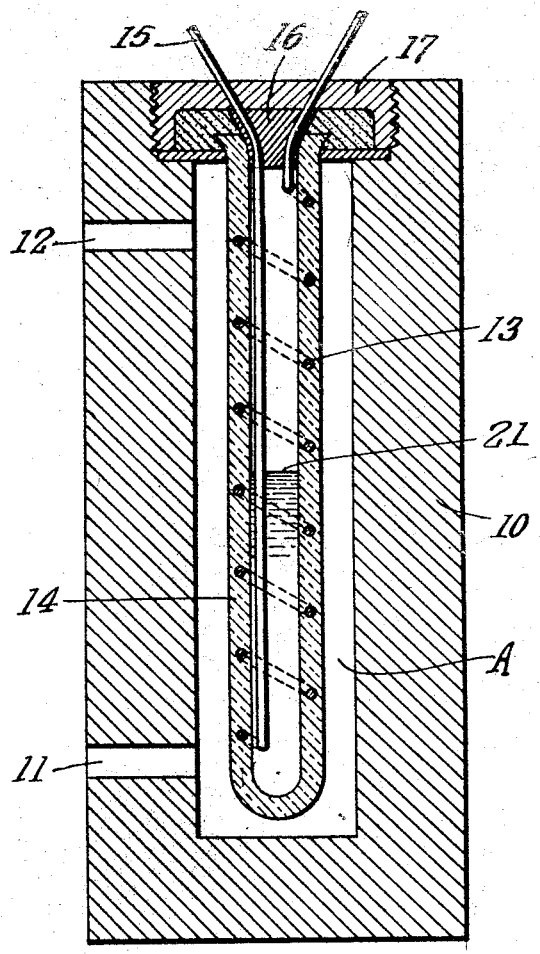
INVENTOR
William O. Hebler
BY
Fred C. Fischer.
ATTORNEY Patented Apr. 28, 1931

1,802,713

UNITED STATES PATENT OFFICE

WILLIAM O. HEBLER, OF NEWARK, NEW JERSEY, ASSIGNOR TO CHARLES ENGELHARD, INC., OF NEWARK, NEW JERSEY, A CORPORATION OF NEW JERSEY

GAS-ANALYSIS APPARATUS

Application filed July 1, 1930. Serial No. 465,100.

This invention relates to gas analysis apparatus, and more particularly to means for varying the rate of heat dissipation of thermal conductivity cells used in such apparatus.

In the patent to Richard H. Krueger, No. 1,698,887, issued January 15, 1929, there is described a device in which the rate of dissipation of heat by a thermal conductivity cell is varied by interposing a metal shield between the heat generating element and the walls of the cell.

That is, the thickness of the walls of the cell are in effect varied, resulting in a varying of the resistance to the flow of heat from the heating element.

It is an object of this invention to provide means for varying the heat dissipation of a conductivity cell by absorbing a portion of the heat generated by the heating element without varying the resistance of the path of flow of the heat to the cell walls.

This object is attained, broadly, by the positioning of a strip of metal or wire or some other heat conducting substance, adjacent the heating element to absorb and conduct away a portion of the heat generated.

This and other advantageous objects, which will later appear, are accomplished by the simple and practical construction and arrangement of parts hereinafter described and exhibited in the accompanying drawings, forming part hereof, and in which:

Figure 1 represents a cross sectional view of a conductivity cell embodying a form of the invention, in which a strip of metal is employed.

Figure 2 represents a similar cross sectional view of the conductivity cell embodying another form of the invention in which a quantity of liquid is employed.

Referring to the drawing, in Figure 1 there is shown a block of metal 10 in which is formed a conductivity cell A, which, communicates with inlet passage 11 and outlet passage 12 formed in the block.

Positioned in the cell is a resistance thermometer which comprises a coil of platinum wire 13 embedded in the walls of a quartz tube 14, one terminal 15 of the wire passing freely up through the quartz envelope. The ends of the heating coil are brought out to a sealing cork 16 in the upper end of the quartz tube 14, the latter being mounted in the upper end of the cell and held therein by a screw cap 17.

When an electrical current is passed through the coil 13, heat is generated, and the flow of heat from the resistance heating element depends upon the thermal conductivity of the gas surrounding the element, the thickness of the cell walls and the heat conducting characteristics of the metal block 10.

It will be seen that all of the quantities affecting the flow of heat from the resistance heating element are fixed, and consequently, any variance in the heat conductivity of a reference cell from the heat conductivity of a standard cell will always exist, and give a faulty determination of the character of the gas being analyzed.

It is therefore necessary that a reference cell be calibrated with a standard cell, the same gas being contained in each cell, when the calibration is made. That is, the reference cell must have the same heat-dissipating characteristics as a standard cell.

Now, according to my invention as disclosed in Figure 1, there is inserted in the quartz tube 14, a strip of metal, preferably in the form of a wire 18, which may be adjustably positioned in the tube 14. By means of this metal wire, the amount of heat dissipated by the heating element to the walls of the cell is affected, as the metal wire 18 will absorb a portion of the heat generated, and conduct such absorbed heat outside of the cell, thus diminishing the amount of heat distributed to the cell wall.

For example, should the dissipation of heat by the cell wall be too slow for the amount current flowing through the coil, a larger portion of the wire will be inserted in the tube in order to absorb a larger quantity of generated heat and diminish the amount of heat flowing through the cell wall.

The wire 18 is resiliently gripped by a split collar 20, or any other suitable or convenient means, attached to the screw cap 17.

By means of this arrangement, the wire is adjustably positioned in the thermometer.

As disclosed in the Krueger patent, the reference cell is in balance with a standard cell when the galvanometer of a Wheatstone bridge (not shown) commonly employed in gas analysis apparatus, shows no deflection, that is, the same amount of current flows through both resistance thermometers; and inasmuch as the current is derived from a common source, the same voltage is impressed upon each heating element; and consequently each heating element will have the same resistance and generate the same amount of heat.

However, such a condition will obtain only when the same gas is contained in each cell and the heat dissipating characteristics of the walls of the cells are equal.

By means of my invention, should the heat dissipating characteristics of the cell walls of the reference and standard cell be unequal, compensation is made by providing means to absorb a portion of the heat generated by one of the resistance heating elements so that both heating elements may generate the same amount of heat, and at the same time, the heat may be dissipated or conducted away from the heating elements equally in the reference cell and in the standard cell, which of course, will result in a balanced condition in a galvanometer of a Wheatstone bridge circuit.

When the reference cell has been calibrated with the standard cell, it is maintained in that condition and no further adjustments need be made thereafter.

In Figure 2 there is disclosed a modification of the invention, in which a quantity of liquid 19, such as oil, is placed in one of the cells in order to make it balance with the other cell. The liquid 19 serves substantially the same purpose as the metal wire 18, that is, it is a heat absorbing means.

After a proper amount of liquid has been inserted, in the tube 14 of one of the resistance heating elements, to obtain the necessary balance between the reference and the standard cells the tube is sealed and no further adjustments need thereafter be made.

It will be noted that the compensation expedients disclosed in this invention are much simpler and less expensive than that disclosed by the Krueger patent. Also, the position of the heating coil is in no manner altered as it is embedded in a quartz tube 14, and its characteristics are changed only by the effect of electrical current and heat, the quartz preventing any appreciable physical change in the coil.

While I have shown the preferred form of my improvement, it will be understood that I do not wish to be limited to the specific details of construction shown for various modifications therein may be made without departing from the spirit and scope of the invention.

Having thus described my invention, what I claim as new and desire to secure by Letters Patent, is:

1. A gas analysis apparatus comprising a block of material adapted to conduct heat and having a cell formed therein, a resistance heating coil mounted in said cell and adjustable means encircled by said coil for absorbing a portion of the heat generated by said heating coil.

2. In a gas analysis apparatus, a quartz tube, a resistance heating element embedded in the walls of said quartz tube, and means adjustably mounted in the tube to absorb a portion of the heat generated by the heating element.

3. In a gas analysis apparatus, a block of heat conducting material having a cell formed therein, a quartz tube mounted in the cell, a resistance heating element embedded in the walls of the tube, and means in the tube for absorbing a portion of the heat generated by the heating element.

4. In a gas analysis apparatus, a block of heat conducting material having a cell formed therein, a quartz tube mounted in the cell, a resistance heating element embedded in the walls of the tube, and a strip of metal adjustably mounted in the tube for absorbing a portion of the heat generated by the heating element.

5. In a gas analysis apparatus, a block of heat conducting material having a cell formed therein, a quartz tube mounted in the cell, a resistance heating element embedded in the walls of the tube, and a quantity of liquid sealed in the tube to absorb a portion of the heat generated by the heating element.

This specification signed this 23rd day of June, 1930.

WILLIAM O. HEBLER.